US012793075B2

(12) United States Patent
Ghosh et al.

(10) Patent No.: US 12,793,075 B2
(45) Date of Patent: Nov. 10, 2026

(54) SYSTEMS AND METHODS FOR DYNAMIC CHANGE POINT AND ANOMALY DETECTION

(71) Applicant: Fidelity Information Services, LLC, Jacksonville, FL (US)

(72) Inventors: Ranadhir Ghosh, St Johns, FL (US); John C. Platais, Menomonee Falls, WI (US); Ross P. Ellison, West Windsor, NJ (US)

(73) Assignee: Fidelity Information Services, LLC, Jacksonville, FL (US)

( * ) Notice: Subject to any disclaimer, the term of this patent is extended or adjusted under 35 U.S.C. 154(b) by 35 days.

(21) Appl. No.: 18/960,778

(22) Filed: Nov. 26, 2024

(65) Prior Publication Data

US 2025/0111377 A1 Apr. 3, 2025

Related U.S. Application Data

(63) Continuation-in-part of application No. 18/478,106, filed on Sep. 29, 2023, now Pat. No. 12,405,805.

(51) Int. Cl.
*G06Q 20/40* (2012.01)

(52) U.S. Cl.
CPC ................................ *G06Q 20/4016* (2013.01)

(58) Field of Classification Search
None
See application file for complete search history.

(56) References Cited

U.S. PATENT DOCUMENTS

2023/0077454 A1* 3/2023 Lovell .................... G06N 3/063 706/15
2023/0110377 A1* 4/2023 Huo ...................... G06F 3/0632 711/154
2023/0252278 A1 8/2023 Kweider et al.
2025/0013657 A1 1/2025 Farooq

OTHER PUBLICATIONS

International Search Report and Written Opinion issued in International Application No. PCT/US2024/048957, issued Oct. 24, 2025 (14 pages).

International Search Report and Written Opinion issued in International Application No. PCT/US2025/057352, issued Feb. 26, 2026 (14 pages).

Dong Young Yoon et al., "FBDetect: Catching Tiny Performance Regressions at Hyperscale through In-Production Monitoring", Proceedings of The 2023 ACM/IEEE Joint Conference on Digital Libraries, ACMPUB27, New York, NY, USA, Nov. 4, 2024 (Nov. 4, 2024), pp. 522-540, XP059851654, DOI:10.1145/3694715.3695977.

* cited by examiner

*Primary Examiner* — Scott C Sun
(74) *Attorney, Agent, or Firm* — Bookoff McAndrews, PLLC

(57) ABSTRACT

A computer-implemented method for processing live streaming data includes performing a change point detection on a time series of data using one or more previously collected time series of data, an identification comprising: identifying one or more non-anomalous blips in the time series of data based on the change point detection, identifying one or more anomalous spikes in the time series of data based on the change point detection, and identifying one or more changes in normal in the time series of data based on the change point detection, displaying the one or more changes in normal from the time series of data based on the identification, and displaying the one or more anoma- (Continued)

lous spikes from the time series of data based on the identification.

18 Claims, 6 Drawing Sheets

SYSTEMS AND METHODS FOR DYNAMIC CHANGE POINT AND ANOMALY DETECTION

CROSS-REFERENCE TO RELATED APPLICATION(S)

This patent application is a continuation-in-part of and claims the benefit of priority to U.S. application Ser. No. 18/478,106, filed on Sep. 29, 2023, the entirety of which is incorporated herein by reference.

TECHNICAL FIELD

Various embodiments of the present disclosure relate generally to information technology (IT) management systems and, more particularly, to systems and methods for dynamic change point and anomaly detection.

BACKGROUND

In computing systems, for example computing systems that perform financial services and electronic payment transactions, programing changes may occur. For example, software may be updated. Changes in the system may lead to incidents, defects, issues, bugs or problems (collectively referred to as incidents) within the system. These incidents may occur at the time of a software change or at a later time. These incidents may be costly for the company as users may not be able to use the services and due to resources expended by the company to resolve the incidents.

These incidents in the system may need to be examined and resolved in order to have the software services perform correctly. Time may be spent by, for example, incident resolution teams, determining what issues arose within the software services. The faster an incident may be resolved, the less potential costs a company may incur. Thus, promptly identifying and fixing such incidents (e.g., writing new code or updating deployed code) may be important to a company.

In a data pipeline it may be difficult for a system to analyze ever-changing data streams or frequencies and determine what is considered anomalous at a group and granular level. The present disclosure is directed to addressing this and other drawbacks to the existing computing system analysis techniques.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In some aspects, the techniques described herein relate to a computer-implemented method for processing live streaming data, the method including: performing a change point detection on a time series of data using one or more previously collected time series of data; an identification including: identifying one or more non-anomalous blips in the time series of data based on the change point detection; identifying one or more anomalous spikes in the time series of data based on the change point detection; and identifying one or more changes in normal in the time series of data based on the change point detection; displaying the one or more changes in normal from the time series of data based on the identification; and displaying the one or more anomalous spikes from the time series of data based on the identification.

In some aspects, the techniques described herein relate to a method, further including setting one or more user input parameters, wherein one or more user input parameter includes a minimum size parameter, a penalty parameter, a change point detection parameter, and an anomaly parameter.

In some aspects, the techniques described herein relate to a method, further including: displaying the one or more changes in normal from the time series of data based on the identification and the one or more user input parameters; and displaying the one or more anomalous spikes from the time series of data based on the identification and the one or more user input parameters.

In some aspects, the techniques described herein relate to a method, setting one or more default parameters, wherein one or more default input parameter includes a minimum size parameter, a penalty parameter, a change point detection, parameter; and an anomaly parameter.

In some aspects, the techniques described herein relate to a method, further including: displaying the one or more changes in normal from the time series of data based on the identification and the one or more default parameters; and displaying the one or more anomalous spikes from the time series of data based on the identification and the one or more default parameters.

In some aspects, the techniques described herein relate to a method, wherein the identifying one or more changes in normal in the time series of data based on the change point detection includes: comparing one or more previously collected time series of data previous periods with the time series of data, and identifying a significant change in mean or standard deviation from one or more previously collected time series of data, and marking one or more changes in normal based on meeting one or more thresholds and one or more user specified criteria and one or more default criteria.

In some aspects, the techniques described herein relate to a method, wherein the change point detection is performed on the time series of data as it is received, and wherein the time series of data is received and processed in real time, and wherein the time series of data is an incoming time series of data from streaming data.

In some aspects, the techniques described herein relate to a method, including: performing a change point detection on a time series of data based on one or more user input parameters and one or more default parameters using a previously collected time series of data.

In some aspects, the techniques described herein relate to a method, further including displaying the one or more anomalous spikes from the time series of data, and further including displaying a change in the one or more changes in new normal from the time series of data.

In some aspects, the techniques described herein relate to a method, wherein if certain thresholds are met we can mark such change in new normal as anomalous changes in mean, standard deviation, or slope of data.

In some aspects, the techniques described herein relate to a method, wherein each data stream can be configured to user's specification allowing each source to have dynamic anomaly detection that ensure all needs are met.

In some aspects, the techniques described herein relate to a method, wherein one or more user input parameters include user setting minimum size parameter.

In some aspects, the techniques described herein relate to a method, wherein one or more user input parameters include user setting penalty parameter.

In some aspects, the techniques described herein relate to a method, the method is implemented using an application programming interface with a unified stream-processing and batch-processing framework.

In some aspects, the techniques described herein relate to a method, wherein dynamic output based on user defined anomaly parameters.

In some aspects, the techniques described herein relate to a method, wherein dynamic output based on user defined change point detection parameters.

In some aspects, the techniques described herein relate to a system for determining group-level anomalies for information technology events, the system including: a memory having processor-readable instructions stored therein; and at least one processor configured to access the memory and execute the processor-readable instructions to perform operations including: performing a change point detection on a time series of data using a previously collected time series of data; an identification including: identifying one or more non-anomalous blips in the time series of data based on the change point detection; identifying one or more anomalous spikes in the time series of data based on the change point detection; and identifying one or more changes in normal in the time series of data based on the change point detection; displaying the one or more changes in normal from the time series of data based on the identification; and displaying the one or more anomalous spikes from the time series of data based on the identification.

In some aspects, the techniques described herein relate to a system, the operations further including: setting one or more user input parameters; wherein one or more user input parameter includes a minimum size parameter; wherein one or more user input parameter includes a penalty parameter; and wherein one or more user input parameter includes a change point detection parameter; wherein one or more user input parameter includes an anomaly parameter; and setting one or more default parameters; wherein one or more default input parameter includes a minimum size parameter; wherein one or more default input parameter includes a penalty parameter; and wherein one or more default input parameter includes a change point detection parameter; wherein one or more default input parameter includes an anomaly parameter.

In some aspects, the techniques described herein relate to a non-transitory computer readable medium storing processor-readable instructions which, when executed by at least one processor, cause the at least one processor to perform operations including: performing a change point detection on a time series of data using a previously collected time series of data; an identification including: identifying one or more non-anomalous blips in the time series of data based on the change point detection; identifying one or more anomalous spikes in the time series of data based on the change point detection; and identifying one or more changes in normal in the time series of data based on the change point detection; displaying the one or more changes in normal from the time series of data based on the identification; and displaying the one or more anomalous spikes from the time series of data based on the identification.

In some aspects, the techniques described herein relate to an operations, further including: setting one or more user input parameters; wherein one or more user input parameter includes a minimum size parameter; wherein one or more user input parameter includes a penalty parameter; and wherein one or more user input parameter includes a change point detection parameter; wherein one or more user input parameter includes an anomaly parameter; and setting one or more default parameters; wherein one or more default input parameter includes a minimum size parameter; wherein one or more default input parameter includes a penalty parameter; and wherein one or more default input parameter includes a change point detection parameter; wherein one or more default input parameter includes an anomaly parameter.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain the principles of the disclosure.

DETAILED DESCRIPTION OF EMBODIMENTS

Figure 1:
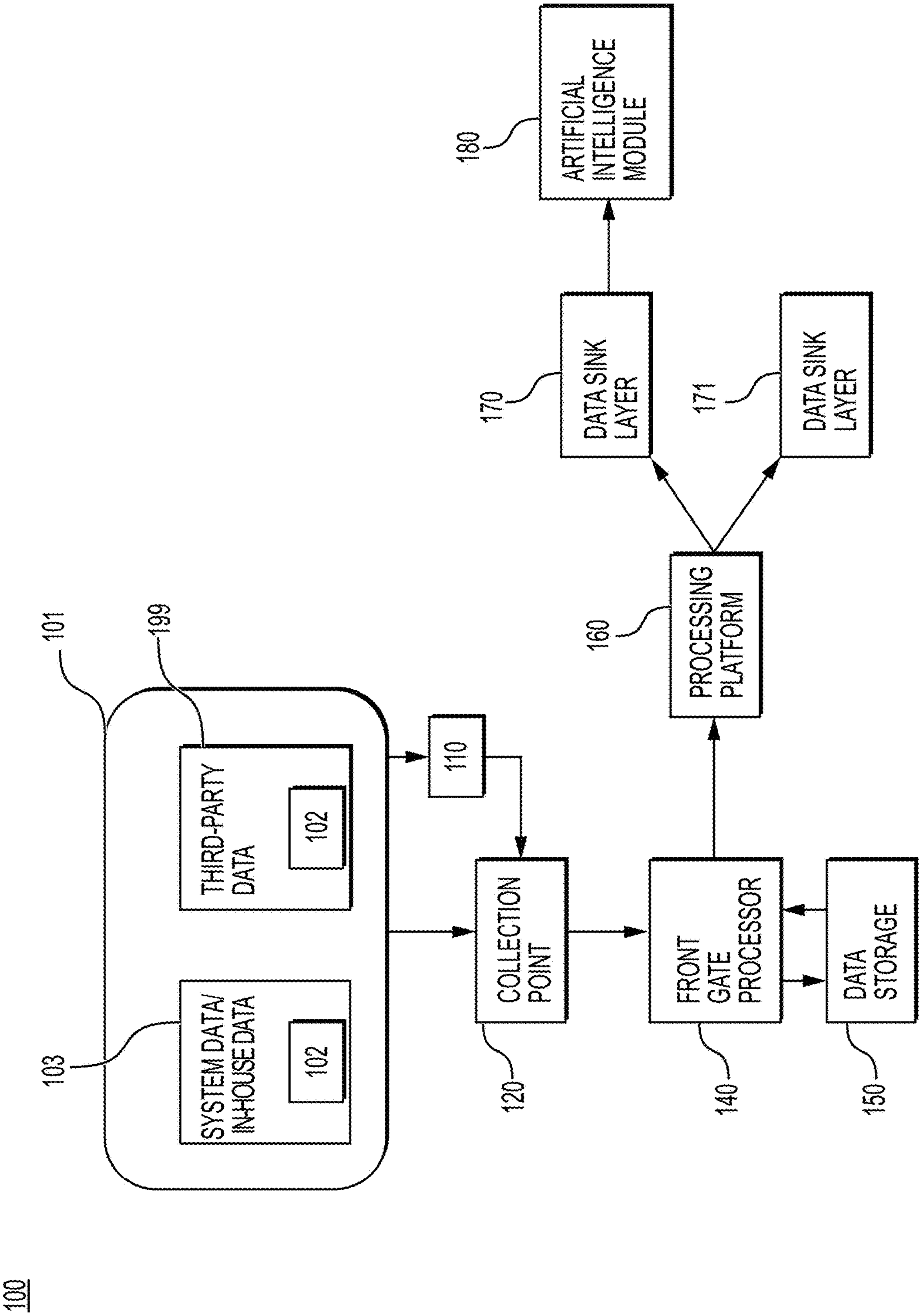
FIG. 1 depicts an exemplary system overview for a data pipeline for an artificial intelligence model to predict and troubleshoot incidents in a system, according to one or more embodiments.

Various embodiments of the present disclosure relate generally to information technology (IT) management systems and, more particularly, to systems and methods for dynamic change point and anomaly detection.

The subject matter of the present disclosure will now be described more fully with reference to the accompanying drawings that show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Software companies have been struggling to avoid outages from incidents that may be caused by upgrading software or hardware components, or changing a member of a team, for example. The system described herein may be configured to analyze and/or process event data for an IT system. The system described herein may for example receive a stream of event data over periods of time. Event data may include, but is not limited: (1) an incident, (2) an alert, (3) change data, (4) a problem; and/or (5) an anomaly.

An incident may be an occurrence that can disrupt or cause a loss of operation, services, or functions of a system. Incidents may be manually reported by customers or personnel, may be automatically logged by internal systems, or may be captured in other ways. An incident may occur from factors such as hardware failure, software failure, software bugs, human error, and/or cyber attacks. Deploying, refactoring, or releasing software code may for example cause an incident. An incident may be detected during, for example, an outage or a performance change. An incident may include characteristics, where an incident characteristic may refer to the quality or traits associated with an incident. For example, incident characteristics may include, but is not limited to, the severity of an incident, the urgency of an incident, the complexity of an incident, the scope of an incident, the cause of an incident, and/or what configurable item corresponds to the incident (e.g., what systems/platforms/products etc. are affected by the incident), how it is described in freeform text, what business segment is effected, what category/subcategory is affected, and/or what assigned group is the incident.

An alert may refer to a notification that informs a system or user of an event. An alert may include a collection of events representing a deviation from normal behavior for a system. For example, an alert may include metadata including a short field description that includes free from text fields (e.g., a summary of the alert), first occurrences, time stamps, an alert key, etc. Understanding the different types of alerts within a system from various perspectives may assist in resolving incidents.

Change data may refer to information that described a modification made to data within a system or database. Change data may track the changes that occur over one or more periods of time. Problem data may refer to any data that causes issues or impedes a systems normal operations. Anomaly data may refer to data that indicates a deviation of a system from a standard or normal operation.

The event data may further include entities effected by the event and their respective relationships. Event data may be associated with one or more configurable items (CIs). A configurable item (CI) may refer a component of a system that can be identified as a self-contained unit for purposes of change control and identification. For example, a particular application, service, particular product, server, may be defined by a CI.

The data pipeline described herein may for example process and receive vast amounts of data. The system described herein may be able to analyze ever-changing data streams and frequencies and determine what is considered anomalous on both group and granular levels. A data source that can appear anomalous may actually be considered normal over a long period of time and a data source that appears normal may actually be considered anomalous in comparison to previous. An anomaly may not always as straightforward as a sudden spike or drop in data but can be marked with a change in the data's stream compared to previous times. The system described herein may be configured to determine when data spikes or drops are anomalous or non-anomalous.

Enterprise organizations must be able to understand ever-changing data streams and frequencies, and also may need to understand what is considered anomalous on both group and granular levels of data coming from computers or systems. A data source that may appear anomalous may be considered normal over a long period of time and a data source that may appear normal may actually be considered anomalous in comparison to previously collected data. An anomaly may not always be as straightforward as a sudden spike or drop in data but may be marked with a change in the data's stream compared to previous times or previously collected data.

One or more embodiments provide a method or system to dynamically identify based on user's specifications one or more types of anomalies as well avoiding misidentifying anomalies as described herein.

One or more embodiments may include a data pipeline configured to identify, based on a user's specification, one or more types (e.g., two types) of anomalies and not misidentify anomalies. One or more embodiments may be configured to incorporate dynamic user defined anomaly and change point detection parameters. A user may update parameters and the system may adjust anomaly detection to decide what gets marked anomalous and what gets marked a blip (e.g., non-anomalous). One or more embodiments may provide for implementation using an application programming interface with a unified stream-processing and batch-processing framework, which may include Pyflink software of Apache Flink. One or more embodiments may provide a system for determining group-level anomalies for information technology events, the system comprising a memory having processor-readable instructions stored therein, and at least one processor configured to access the memory and execute the processor-readable instructions to perform operations including operations detailed in the Detailed Description. One or more embodiments may provide a non-transitory computer readable medium storing processor-readable instructions which, when executed by at least one processor, cause the at least one processor to perform operations including performing a change point detection on a time series of data using a previously collected time series of data, along with other operations detailed in the Detailed Description.

Change point detection may identified in one or more ways including time range (e.g., a time interval where the change point occurs) so this could be a range, and also may include a collection of the data points within the change point. One or more embodiments may include change point detection may be defined as a vector or index that includes the various data within the change point.

One or more embodiments may provide real-time anomaly and change point detection. The system described herein may for example receive a stream of data that may be processed simultaneously. The system may provide stream data processing that allows for real-time analysis this is a significant improvement over batch processing which can only process data after collecting it over a certain period. With stream processing data can be analyzed and acted on as soon as it arrives. This may for example lead to anomalies being properly identified and acted on sooner. This system may further lead to less false positives for anomaly detection.

One or more embodiments may be configured to provide all types of anomaly detection. The system may be configured to change what is considered anomalous over time. For example, previous periods of data ingestion can be compared and the system may determine if there is a significant change in mean, standard deviation, or slope from previous periods. If certain thresholds and criteria are met then the system may mark such change in new normal as anomalous.

One or more embodiments may include identifying one or more changes in normal in the time series of data based on the change point detection, and may include comparing one or more previously collected time series of data with a time series of data that is received in real-time, and identifying a significant change in mean or standard deviation from the one or more previously collected time series of data, and marking one or more changes in normal based on meeting one or more thresholds and one or more user specified criteria and one or more default criteria. One or more embodiments may include only one or more thresholds, only one or more user specified criteria, or only one or more default criteria. One or more embodiments may provide one or more thresholds, one or more user specified criteria, or one or more default criteria together. For example, changes in new normal may include previous periods which can be compared and seeing if there is a significant change in mean or standard deviation from previous periods, when looking at new data. If certain thresholds and criteria are met then such change in new normal may be marked as anomalous.

One or more embodiments may include scalable solutions. For example, each data stream can be fine-tuned or configured to a user or system's specifications allowing each source to have dynamic anomaly detections that ensure all of an organization's needs or users' needs or system's needs are met.

One or more embodiments may provide for various types of data processing in order to identify correlations, similarity, and root causes, and recommend a corrective action based on received data as well as user feedback mechanisms. One or more embodiments may be extended to clients and users of services and software with applications that are connected to the system described herein.

Some data anomaly detection systems rely on post data collection analysis on data that has already been stored and is neither real time nor streaming. These systems may detect anomalies but the damage may have already been done to a system by the time the anomaly is identified. Furthermore, anomalies may be falsely detected or not detected at all. One or more embodiments of the invention may provide using change point detection to solve problems relating to mislabeling of blips as anomalous and furthermore detecting anomalies that may otherwise go undetected. One or more embodiments may include libraries, for example ruptures library, that may include one or more parameters, for example a min_size parameter or penalty parameter. One or more embodiments may include parameters being user defined, or alternatively default parameters. One or more embodiments may provide software to classify if a new normal has been detected, looking at change in values (for example, mean and standard deviation) of one period to another given that each period may have reached a certain amount of time (for example, more than either a blip, or an anomalous spike).

One or more embodiments may provide a computer-implemented method for processing live streaming data, the method comprising performing a change point detection on a time series of data (which may include real-time data or live streaming data) using one or more previously collected time series of data. An identification of one or more non-anomalous blips, anomalous spikes, or changes in normal (which may include changes in new normal) may include identifying one or more non-anomalous blips in the time series of data based on the change point detection, identifying one or more anomalous spikes in the time series of data based on the change point detection, and identifying one or more changes in normal in the time series of data based on the change point detection. One or more embodiments may provide a system or method which may include displaying the one or more changes in normal from the time series of data based on the identification, and displaying the one or more anomalous spikes from the time series of data based on the identification. Displaying may include highlighting anomalies or changes in new normal on a graphical user interface, or highlighting on a graph or other data display. This displaying may be dynamic and may occur in real-time or near real-time.

One or more embodiments may provide setting one or more user input parameters, wherein one or more user input parameter includes a minimum size parameter, a penalty parameter, a change point detection parameter, and an anomaly parameter. One or more embodiments may provide displaying the one or more changes in normal from the time series of data based on the identification and the one or more user input parameters, and displaying the one or more anomalous spikes from the time series of data based on the identification and the one or more user input parameters. One or more embodiments may provide setting one or more default parameters, wherein one or more default input parameter includes a minimum size parameter, a penalty parameter, a change point detection, parameter, and an anomaly parameter. One or more embodiments may provide a user setting some user input parameters and the remaining parameters being default parameters.

One or more embodiments may provide displaying one or more changes in normal from a time series of data based on an identification, and based on one or more default parameters, and may provide displaying the one or more anomalous spikes from the time series of data based on an identification and one or more default parameters.

FIG. 1 depicts an exemplary system overview for a data pipeline for an artificial intelligence model to predict and troubleshoot incidents in a system, according to one or more embodiments. For example, the data pipeline system 100, may aggregate and send incident data to an artificial intelligence model 180, wherein the artificial intelligence model 180 is configured to aggregate and map incident characteristics into daily incident proles using feature engineering and/or multiple level clustering. The data pipeline system 100 may be a platform with multiple interconnected components. The data pipeline system 100 may include one or more servers, intelligent networking devices, computing devices, components, and corresponding software for aggregating and processing data.

As shown in FIG. 1, a data pipeline system 100 may include a data source 101, a collection point 120, a secondary collection point 110, a front gate processor 140, data storage 150, a processing platform 160, a data sink layer 170, a data sink layer 171, and an artificial intelligence module 180.

The data source 101 may include in-house data 103 and third party data 199. The in-house data 103 may be a data source directly linked to the data pipeline system 100. Third party data 199 may be a data source connected to the data pipeline system 100 externally as will be described in greater detail below.

Both the in-house data 103 and third party data 199 of the data source 101 may include incident data 102. Incident data 102 may include incident reports with information for each incident provided with one or more of an incident number, closed date/time, category, close code, close note, long description, short description, root cause, or assignment group. Incident data 102 may include incident reports with information for each incident provided with one or more of an issue key, description, summary, label, issue type, fix version, environment, author, or comments. Incident data 102 may include incident reports with information for each incident provided with one or more of a file name, script name, script type, script description, display identifier, message, committer type, committer link, properties, file changes, or branch information. Incident data 102 may include one or more of real-time data, market data, performance data, historical data, utilization data, infrastructure data, or security data. These are merely examples of information that may be used as data, and the disclosure is not limited to these examples.

Incident data 102 may be generated automatically by monitoring tools that generate alerts and incident data to provide notification of high-risk actions, failures in IT environment, and may be generated as tickets. Incident data may include metadata, such as, for example, text fields, identifying codes, and time stamps.

The in-house data 103 may be stored in a relational database including an incident table. The incident table may be provided as one or more tables, and may include, for example, one or more of problems, tasks, risk conditions, incidents, or changes. The relational database may be stored in a cloud. The relational database may be connected through encryption to a gateway. The relational database may send and receive periodic updates to and from the cloud. The cloud may be a remote cloud service, a local service, or any combination thereof. The cloud may include a gateway connected to a processing API configured to transfer data to the collection point 120 or a secondary collection point 110. The incident table may include incident data 102.

Data pipeline system 100 may include third party data 199 generated and maintained by third party data producers. Third party data producers may produce incident data 102 from Internet of Things (IoT) devices, desktop-level devices, and sensors. Third party data producers may include but are not limited to Tryambak, Appneta, Oracle, Prognosis, ThousandEyes, Zabbix, ServiceNow, Density, Dyatrace, etc. The incident data 102 may include metadata indicating that the data belongs to a particular client or associated system.

The data pipeline system 100 may include a secondary collection point 110 to collect and pre-process incident data 102 from the data source 101. The secondary collection point 110 may be utilized prior to transferring data to a collection point 120. The secondary collection point 110 point may for example be an Apache Minifi software. In one example, the secondary collection point 110 may run on a microprocessor for a third party data producer. Each third party data producer may have an instance of the secondary collection point 110 running on a microprocessor. The secondary collection point 110 may support data formats including but not limited to JSON, CSV, Avro, ORC, HTML, XML, and Parquet. The secondary collection point 110 may encrypt incident data 102 collected from the third party data producers. The secondary collection point 110 may encrypt incident data, including, but not limited to, Mutual Authentication Transport Layer Security (mTLS), HTTPs, SSH, PGP, IPsec, and SSL. The secondary collection point 110 may perform initial transformation or processing of incident data 102. The secondary collection point 110 may be configured to collect data from a variety of protocols, have data provenance generated immediately, apply transformations and encryptions on the data, and prioritize data.

The data pipeline system 100 may include a collection point 120. The collection point 120 may be a system configured to provide a secure framework for routing, transforming, and delivering data across from the data source 101 to downstream processing devices (e.g., the front gate processor 140). The collection point 120 may for example be a software such as Apache NiFi. The collection point 120 may receive raw data and the data's corresponding fields such as the source name and ingestion time. The collection point 120 may run on a Linux Virtual Machine (VM) on a remote server. The collection point 120 may include one or more nodes. For example, the collection point 120 may receive incident data 102 directly from the data source 101. In another example, the collection point 120 may receive incident data 102 from the secondary collection point 110. The secondary collection point 110 may transfer the incident data 102 to the collection point 120 using, for example, Site-to-Site protocol. The collection point 120 may include a flow algorithm. The flow algorithm may connect different processors, as described herein, to transfer and modify data from one source to another. For each third party data producer, the collection point 120 may have a separate flow algorithm. Each flow algorithm may include a processing group. The processing group may include one or more processors. The one or more processors may, for example, fetch incident data 102 from the relational database. The one or more processors may utilize the processing API of the in-house data 103 to make an API call to a relational database to fetch incident data 102 from the incident table. The one or more processors may further transfer incident data 102 to a destination system such as a front gate processor 140. The collection point 120 may encrypt data through HTTPS, Mutual Authentication Transport Layer Security (mTLS), SSH, PGP, IPsec, and/or SSL, etc. The collection point 120 may support data formats including but not limited to JSON, CSV, Avro, ORC, HTML, XML, and Parquet. The collection point 120 may be configured to write messages to clusters of a front gate processor 140 and communication with the front gate processor 140.

The data pipeline system 100 may include a distributed event streaming platform such as a front gate processor 140. The front gate processor 140 may be connected to and configured to receive data from the collection point 120. The front gate processor 140 may be implemented in an Apache Kafka cluster software system. The front gate processor 140 may include one or more message brokers and corresponding nodes. The message broker may for example be an intermediary computer program module that translates a message from the formal messaging protocol of the sender to the formal messaging protocol of the receiver. The message broker may be on a single node in the front gate processor 140. A message broker of the front gate processor 140 may run on a virtual machine (VM) on a remote server. The collection point 120 may send the incident data 102 to one or more of the message brokers of the front gate processor 140. Each message broker may include a topic to store similar categories of incident data 102. A topic may be an ordered log of events. Each topic may include one or more sub-topics. For example, one sub-topic may store incident data 102 relating to network problems and another topic may store incident data 102 related to security breaches from third party data producers. Each topic may further include one or more partitions. The partitions may be a systematic way of breaking the one topic log file into many logs, each of which can be hosted on a separate server. Each partition may be configured to store as much as a byte of incident data 102. Each topic may be partitioned evenly between one or more message brokers to achieve load balancing and scalability. The front gate processor 140 may be configured to categorize the received data into a plurality of client categories, thereby forming a plurality of datasets associated with the respective client categories. These datasets may be stored separately within the storage device as described in greater detail below. The front gate processor 140 may further transfer data to storage and to processors for further processing.

For example, the front gate processor 140 may be configured to assign particular data to a corresponding topic. Alert sources may be assigned to an alert topic, and incident data may be assigned to an incident topic. Change data may be assigned to a change topic. Problem data may be assigned to a problem topic.

The data pipeline system 100 may include a software framework for data storage 150. The data storage 150 may be configured for long term storage and distributed processing. The data storage 150 may be implemented using, for example, Apache Hadoop. The data storage 150 may store incident data 102 transferred from the front gate processor 140. In particular, data storage 150 may be utilized for distributed processing of incident data 102, and Hadoop distributed file system (HDFS) within the data storage may be used for organizing communications and storage of incident data 102. For example, the HDFS may replicate any node from the front gate processor 140. This replication may protect against hardware or software failures of the front gate processor 140. The processing may be performed in parallel on multiple servers simultaneously.

The data storage 150 may include an HDFS that is configured to receive the metadata (e.g., incident data). The data storage 150 may further process the data utilizing a MapReduce algorithm. The MapReduce algorithm may allow for parallel processing of large data sets. The data storage 150 may further aggregate and store the data utilizing Yet Another Resource Negotiation (YARN). YARN may be used for cluster resource management and planning tasks of the stored data. For example, a cluster computing framework, such as the processing platform 160, may be arranged to further utilize the HDFS of the data storage 150. For example, if the data source 101 stops providing data, the processing platform 160 may be configured to retrieve data from the data storage 150 either directly or through the front gate processor 140. The data storage 150 may allow for the distributed processing of large data sets across clusters of computers using programming models. The data storage 150 may include a master node and an HDFS for distributing processing across a plurality of data nodes. The master node may store metadata such as the number of blocks and their locations. The main node may maintain the file system namespace and regulate client access to said files. The main node may comprise files and directories and perform file system executions such as naming, closing, and opening files. The data storage 150 may scale up from a single server to thousands of machines, each offering local computation and storage. The data storage 150 may be configured to store the incident data in an unstructured, semi-structured, or structured form. In one example, the plurality of datasets associated with the respective client categories may be stored separately. The master node may store the metadata such as the separate dataset locations.

The data pipeline system 100 may include a real-time processing framework, e.g., a processing platform 160. In one example, the processing platform 160 may be a distributed dataflow engine that does not have its own storage layer. For example, this may be the software platform Apache Flink. In another example, the software platform Apache Spark may be utilized. The processing platform 160 may support stream processing and batch processing. Stream processing may be a type of data processing that performs continuous, real-time analysis of received data. Batch processing may involve receiving discrete data sets processed in batches. The processing platform 160 may include one or more nodes. The processing platform 160 may aggregate incident data 102 (e.g., incident data 102 that has been processed by the front gate processor 140) received from the front gate processor 140. The processing platform 160 may include one or more operators to transform and process the received data. For example, a single operator may filter the incident data 102 and then connect to another operator to perform further data transformation. The processing platform 160 may process incident data 102 in parallel. A single operator may be on a single node within the processing platform 160. The processing platform 160 may be configured to filter and only send particular processed data to a particular data sink layer. For example, depending on the data source of the incident data 102 (e.g., whether the data is in-house data 103 or third party data 199), the data may be transferred to a separate data sink layer (e.g., data sink layer 170, or data sink layer 171). Further, additional data that is not required at downstream modules (e.g., at the artificial intelligence module 180) may be filtered and excluded prior to transferring the data to a data sink layer.

The processing platform 160 may perform three functions. First, the processing platform 160 may perform data validation. The data's value, structure, and/or format may be matched with the schema of the destination (e.g., the data sink layer 170). Second, the processing platform 160 may perform a data transformation. For example, a source field, target field, function, and parameter from the data may be extracted. Based upon the extracted function of the data, a particular transformation may be applied. The transformation may reformat the data for a particular use downstream. A user may be able to select a particular format for downstream use. Third, the processing platform 160 may perform data routing. For example, the processing platform 160 may select the shortest and/or most reliable path to send data to a respective sink layer (e.g., sink layer 170 and/or sink layer 171).

In one example, the processing platform 160 may be configured to transfer particular sets of data to a data sink layer. For example, the processing platform 160 may receive input variables for a particular artificial intelligence module 180. The processing platform 160 may then filter the data received from the front gate processor 140 and only transfer data related to the input variables of the artificial intelligence module 180 to a data sink layer.

The data pipeline system 100 may include one or more data sink layers (e.g., data sink layer 170 and data sink layer 171). Incident data 102 processed from processing platform 160 may be transmitted to and stored in data sink layer 170. In one example, the data sink layer 171 may be stored externally on a particular client's server. The data sink layer 170 and data sink layer 171 may be implemented using a software such as, but not limited to, PostgreSQL, HIVE, Kafka, OpenSearch, and Neo4j. The data sink layer 170 may receive in-house data 103, which have been processed and received from the processing platform 160. The data sink layer 171 may receive third party data 199, which have been processed and received from the processing platform 160. The data sink layers may be configured to transfer incident data 102 to an artificial intelligence module 180. The data sink layers may be data lakes, data warehouses, or cloud storage systems. Each data sink layer may be configured to store incident data 102 in both a structured or unstructured format. Data sink layer 170 may store incident data 102 with several different formats. For example, data sink layer 170 may support data formats such as JavaScript Objection Notation (JSON), comma-separated value (CSV), Avro, Optimized Row Columnar (ORC), Hypertext Markup Language (HTML), Extensible Markup Language (XML), or Parquet, etc. The data sink layer (e.g., data sink layer 170 or data sink layer 171), may be accessed by one or more separate components. For example, the data sink layer may be accessed by a Non-structured Query language ("NoSQL") database management system (e.g., a Cassandra cluster), a graph database management system (e.g., Neo4j cluster), further processing programs (e.g., Kafka+Flink programs), and a relation database management system (e.g., postgres cluster). Further processing may thus be performed prior to the processed data being received by an artificial intelligence module 180.

The data pipeline system 100 may include an artificial intelligence module 180. The artificial intelligence module 180 may include a machine-learning component. The artificial intelligence module 180 may use the received data in order to train and/or use a machine learning model. The machine learning model may be, for example, a neural network. Nonetheless, it should be noted that other machine learning techniques and frameworks may be used by the artificial intelligence module 180 to perform the methods contemplated by the present disclosure. For example, the systems and methods may be realized using other types of supervised and unsupervised machine learning techniques such as regression problems, random forest, cluster algorithms, principal component analysis (PCA), reinforcement learning, or a combination thereof. The artificial intelligence module 180 may be configured to extract and receive data from the data sink layer 170.

Conventional data anomaly detection may rely on post data collection analysis on data that has already been stored and is not being received in real-time. By the time the anomalies are detected damage may have already been done or an anomaly may have been falsely detected or not detected at all.

The system described herein (e.g., system 100) may use change point detection to solve the problems of mislabeling blips as anomalous and detect anomalies that may otherwise go undetected. The system may for example utilize the processing platform 160 to perform this detection. For example, Pyflink software of Apache Flink may be implemented.

The system may for example be able to define three types of change points within data detection. A change point may refer to a significant and identifiable shift in the characteristics or patterns of received data over time. The types of change points identified may be: (1) a quick blip of data that is not an anomaly; (2) an anomalous blip; and (3) a new normal being identified in data.

The system described herein may first be configured to identify a change point and to secondly may be configured to identify what type of change point a section of data should be labeled as.

The system 100 may for example implement a rupture library. The following code may be implemented:

```
algo = rpt.Pelt(model="l1",
    min_size=4, jump=5).fit(spectrum_array)
result_pelt = algo.predict(pen=20)
```

The min_size parameter may allow a user to specify the minimum amount of duration they require for an anomaly detected. In this case spikes below 40 minutes may be considered just blips, and spikes above 40 minutes may be considered anomalous.

In addition to the rupture package, additional code may be implemented by the system to determine if a "new normal" has been detected. This additional code may be implemented to analyze the change in mean and standard deviation of one period to another given that each period has reached a certain amount of time (more than either a blip, or an anomalous spike). The code may be as follows:

```
    def detect_new_normal_anomaly(self):
  for i in range(len(self.changepoints)-1):
      start, end = self.changepoints[i],
      self.changepoints[i+1]
      segment = self.data[start:end]
      if len(segment) > self.threshold:
        segment_mean = np.mean(segment)
        prev_data = self.data[:start]
        prev_mean = np.mean(prev_data)
        prev_std = np.std(prev_data)
        if segment_mean < prev_mean -2*prev_std or
        segment_mean > prev_mean+2*prev_std:
          self.new_normal_points.append((start,end))
  if self.new_normal_points:
      print(f'New Normal detected at points
{self.new_normal_points}")
  else:
      print("no new normal detected")
```

The system may allow for input of a user to further set parameters on how easily the user wants to pick up changes in data and parameters to consider a new normal being started. If the user want to more easily detect changes in data the penalty parameter can be reduced, and the number of standard deviations required to detect a change in new normal can be reduced as well.

By utilizing the processing platform 160 (for example PyFlink) with the code described above, the system may allow for the output of real time analysis and detect real time changes in data's new normal and anomalous spikes. Conventional systems may have utilized batch processors to allow for change point detection and the conventional systems may have lacked the required logic and compute to properly detect anomalies and avoid false positives.

Figure 2:
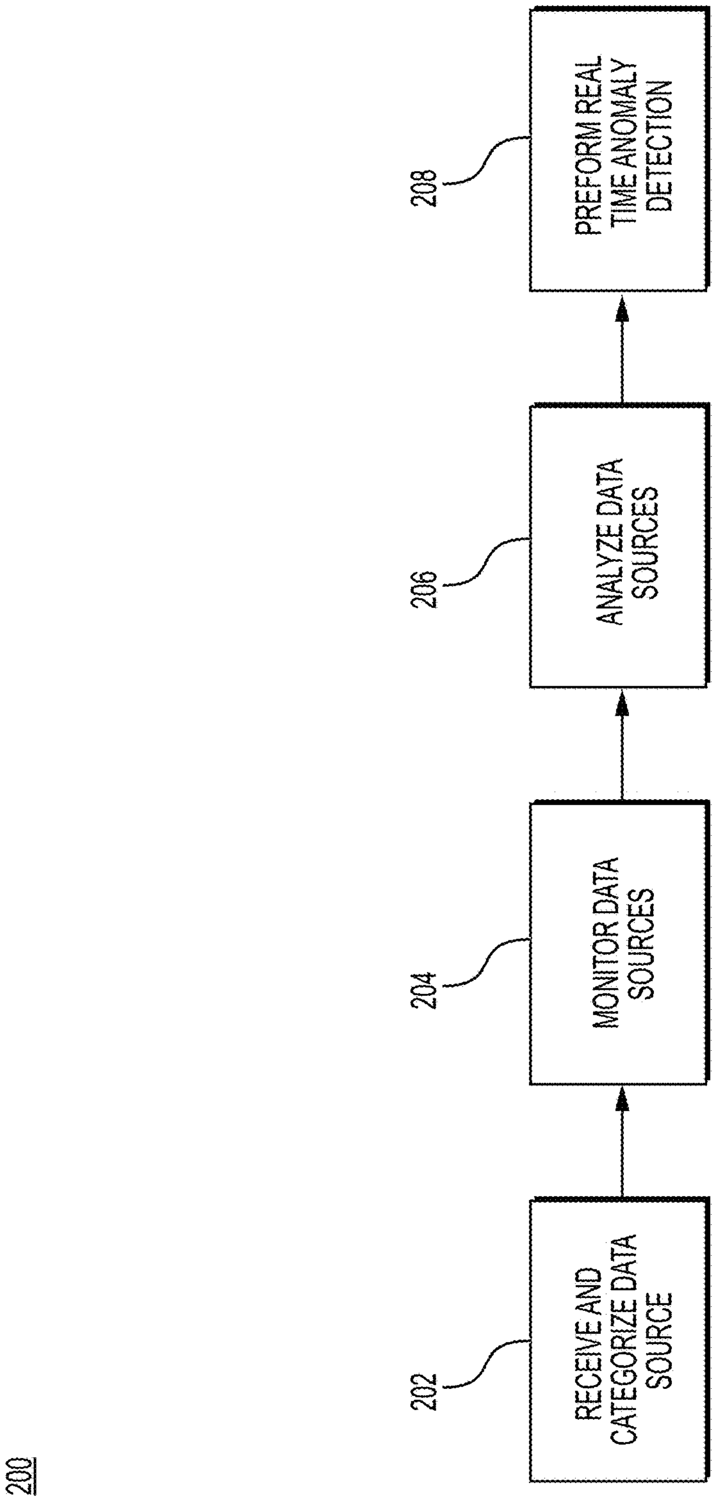
FIG. 2 depicts a flowchart for a process of real-time stream data processing, according to one or more embodiments.

FIG. 2 depicts a flowchart for a process of real-time stream data processing, according to one or more embodiments.

As depicted in flowchart for a process 200, at step 202, the system may for example receive as input individual data sources. For example, the system may be configured to receive hundreds of thousands of individual data sources. The system may be configured to receive greater or fewer than hundreds of thousands of individual data sources. Further, the system may categorize the data sources into a group for common processing. At step 204, the system described herein may monitor the data sources individually and as a group, utilizing the techniques described herein. The system may monitor each data source as part of a group in a framework or a distributed processing engine for stateful computations over unbounded and bounded data streams. The system may include implementation with a Python API for Apache Flink such as PyFlink utilizing the techniques described herein. At step 206, the system described herein may analyze, in real time, data sources and groupings of data. At step 208, the system may apply real time anomaly detection of the individual and group level data sources utilizing the techniques described herein.

The system may for example utilize two techniques in stream-data processing: windowing for group-level anomaly detection and matrix profile for individual data source anomaly detection. Both techniques may be implemented by the processing platform 160.

Figure 3:
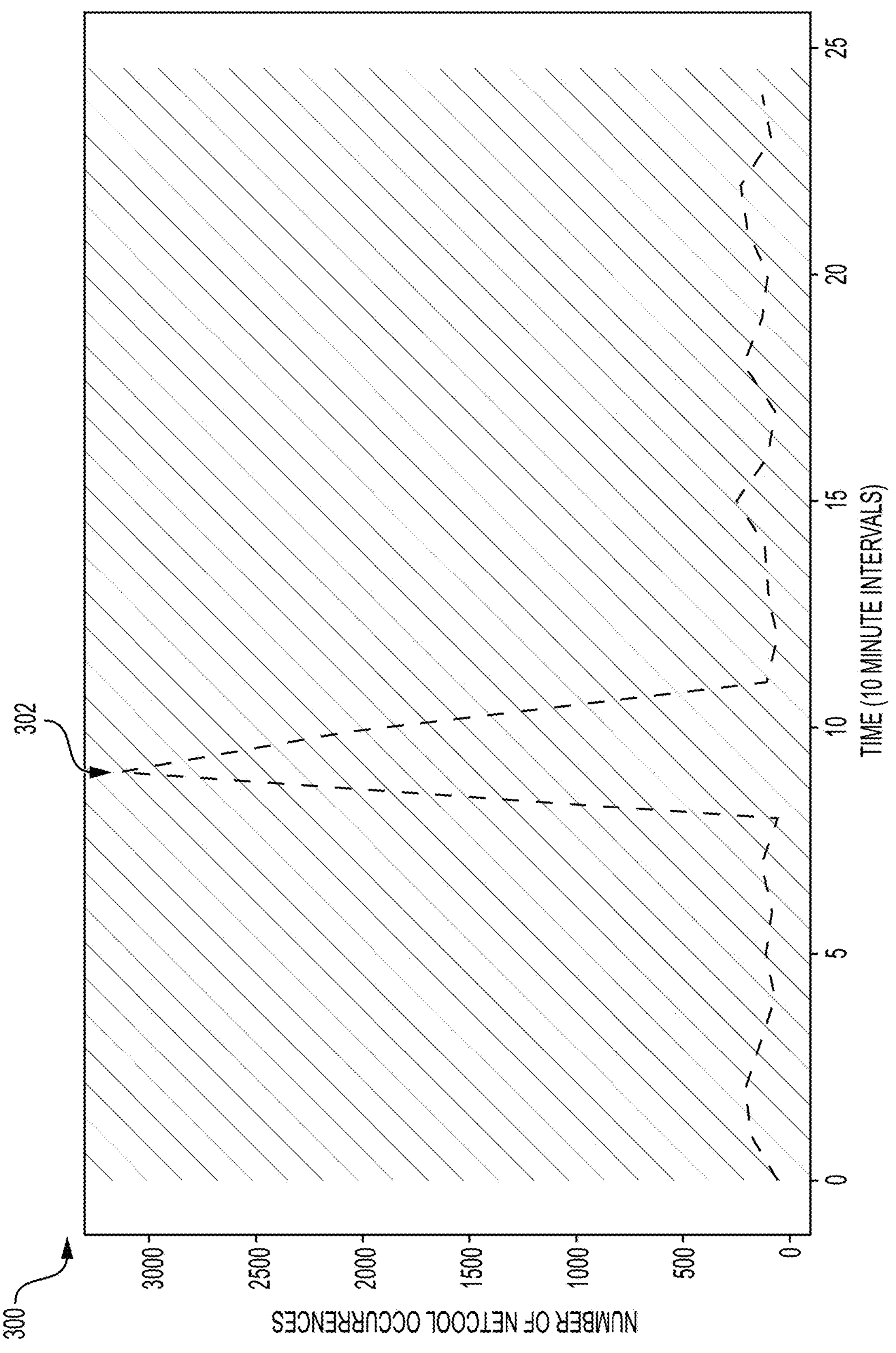
FIG. 3 depicts an exemplary graph of a non-anomalous blip of a data spike, according to one or more embodiments.
Figure 4:
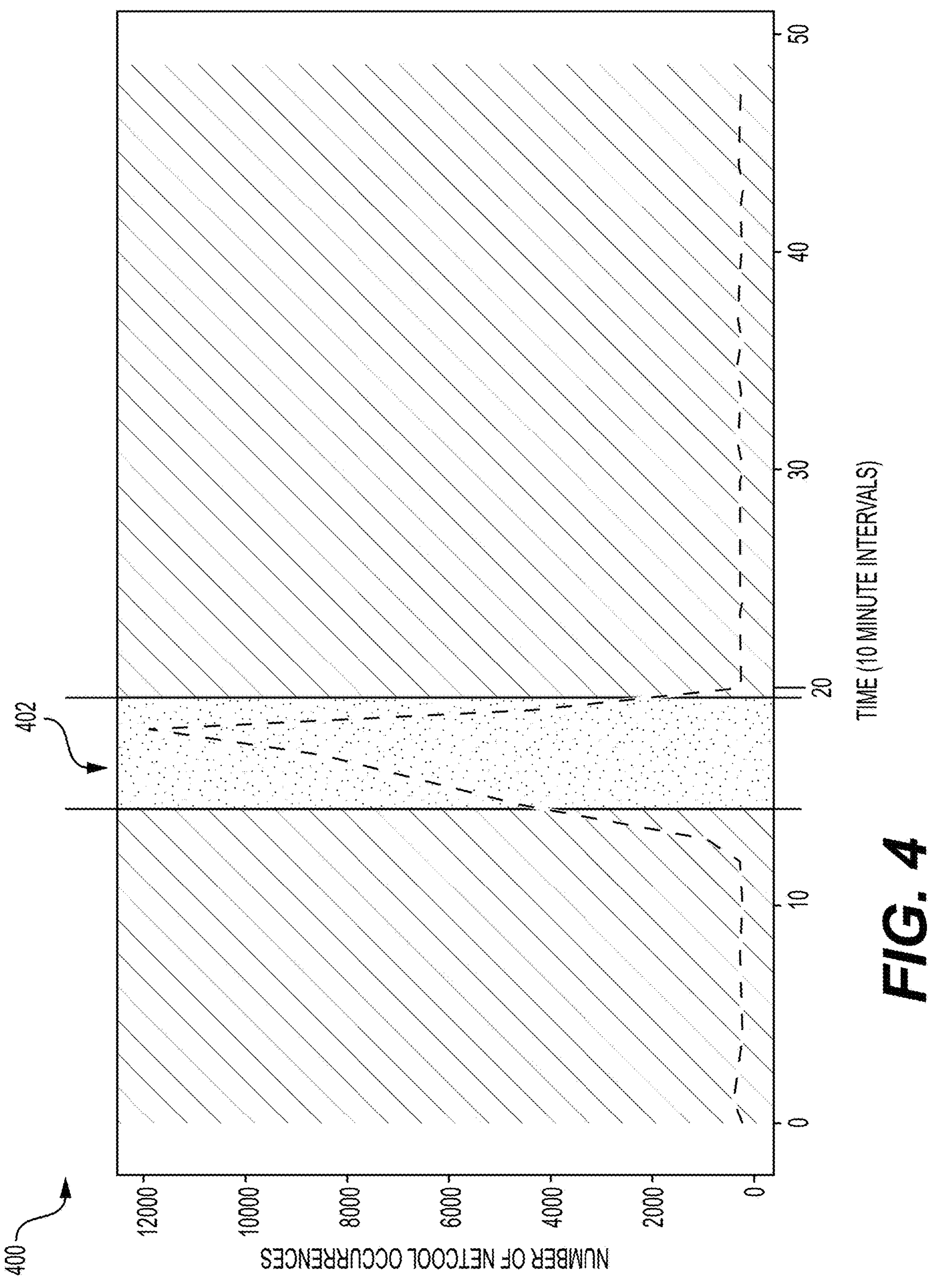
FIG. 4 depicts an exemplary graph of an anomalous blip of a data spike, according to one or more embodiments.
Figure 5:
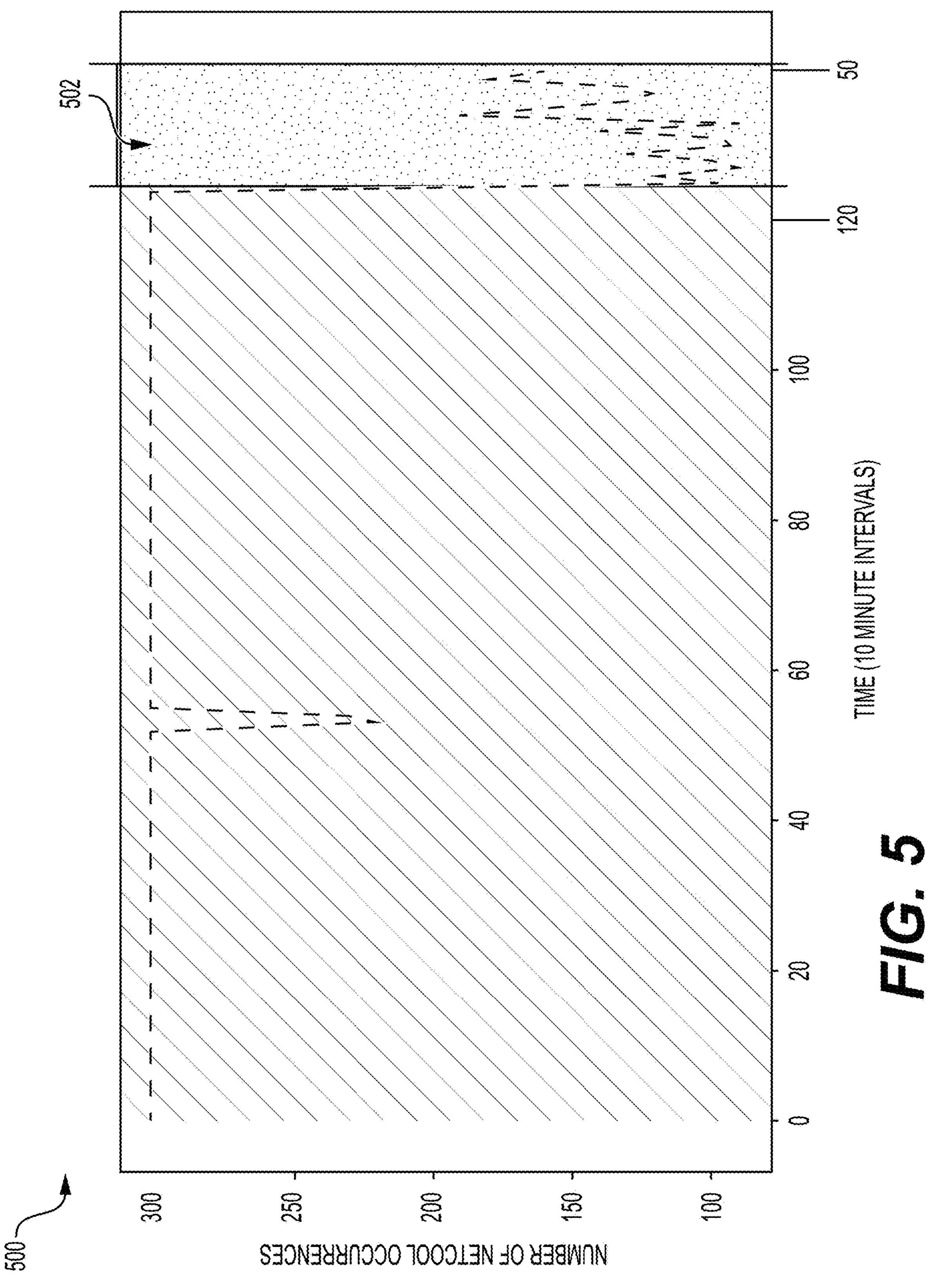
FIG. 5 depicts an exemplary graph of a change in data received normally and a corresponding anomalous blip, according to one or more embodiments.

FIG. 3-5 may depict the types of change points identified, which may be: (1) a quick blip of data that is not an anomaly; (2) an anomalous blip; and (3) a new normal being identified in data. FIG. 3 may depict type 1, FIG. 4 may depict type 2, and FIG. 5 may depict type 3.

FIG. 3 depicts an exemplary graph of a non-anomalous blip of a data spike, according to one or more embodiments. The system described herein may expect data spikes that are considered non-anomalous. If the user of a certain data source knows that spikes occur for a given amount of time they may choose to call that spike non-anomalous. FIG. 3 depicts how, from 80 minutes until 110 minutes (30 minutes total) there may be a spike in the raw amount of incoming data. Graph 300 may include non-anomalous blip 302. Depending on the data's past behavior the user may believe that this is expected and not want to describe it as anomalous. The user's input may easily be used to specify what may be a blip and what may be anomalous. If a 30 minute spike is expected, it can be marked as a blip and not anomalous.

FIG. 4 depicts an exemplary graph of an anomalous blip of a data spike, according to one or more embodiments. Graph 400 may include anomalous blip 402.

If data spikes for a certain period of time longer than what would be expected the system can take this into consideration and mark spikes that occur longer than a certain period of time as anomalous. In the FIG. 4 the graph 400 depicts spikes from 140 minutes until 190 minutes (50 minutes total). Depending on the criteria (e.g., the parameters chosen) the system may choose to mark this as an anomalous spike in data that can be further looked into.

FIG. 5 depicts an exemplary graph of a change in data received normally and a corresponding anomalous blip, according to one or more embodiments. Graph 500 may include non-anomalous blip 502.

In the graph 500, data may be received relatively steady at 300 records every 10 minutes. Starting at the 125 minute mark the number of records may drop and remain at around 125 records every 10 minutes. This "change in new normal" anomaly may signify that the data may no longer be acting like it had been before and may warrant further investigation.

Figure 6:
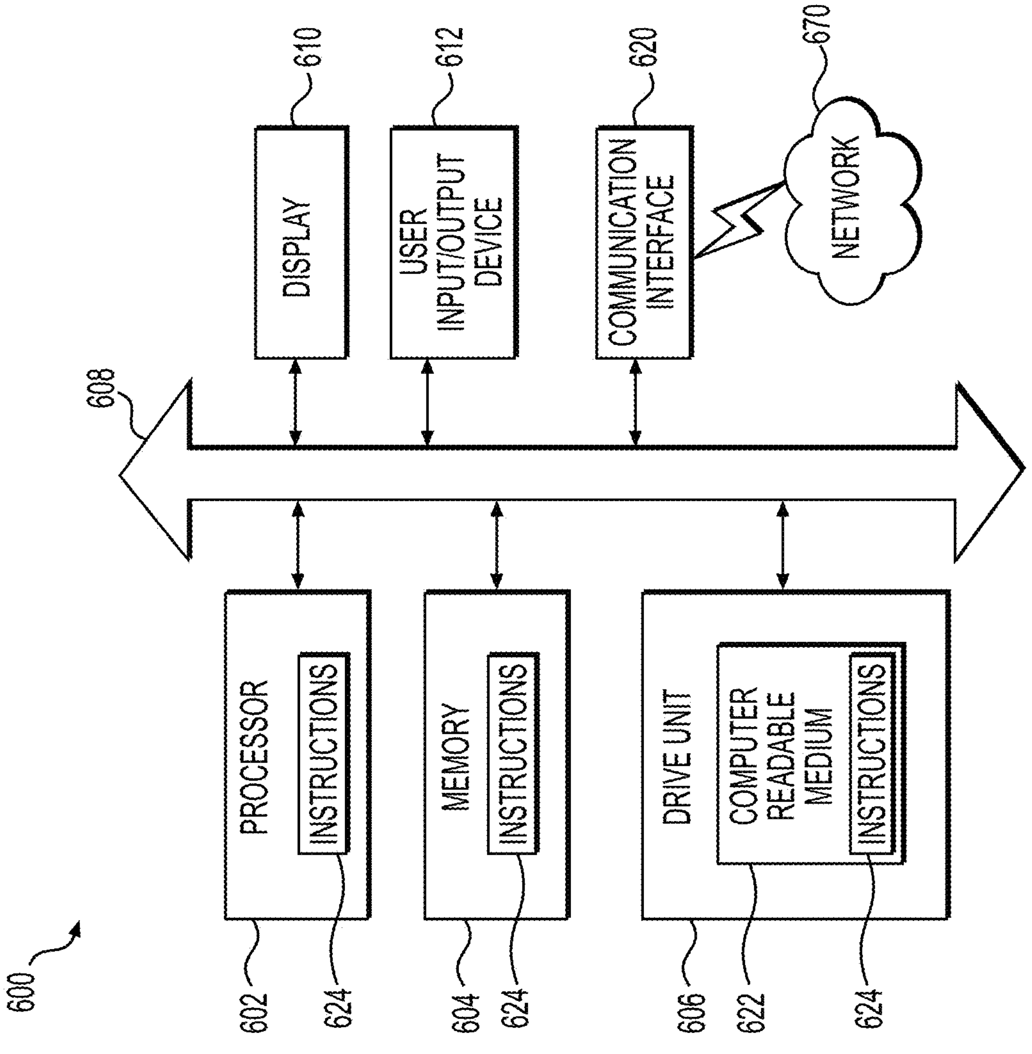
FIG. 6 illustrates a computer system for executing the techniques described herein, according to one or more embodiments of the present disclosure.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel payment and the like.

As shown, the computer system 600 may further include a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input device 612 configured to allow a user to interact with any of the components of system 600. The input device 612 may be a number pad, a keyboard, or a cursor control device, such as a mouse, or a joystick, touch screen display, remote control, or any other device operative to interact with the computer system 600.

The computer system 600 may also or alternatively include a disk or optical drive unit 606. The disk drive unit 606 may include a computer-readable medium 622 in which one or more sets of instructions 624, e.g., software, can be embedded. Further, the instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 670 can communicate voice, video, audio, images, or any other data over the network 670. Further, the instructions 624 may be transmitted or received over the network 670 via a communication port or communication interface 620, and/or using a bus 608. The communication port or communication interface 620 may be a part of the processor 602 or may be a separate component. The communication port or communication interface 620 may be created in software or may be a physical connection in hardware. The communication interface 620 may be configured to connect with a network 670, external media, the display 610, or any other components in system 600, or combinations thereof. The connection with the network 670 may be a physical connection, such as a wired Ethernet connection or may be established wirelessly as discussed below. Likewise, the additional connections with other components of the system 600 may be physical connections or may be established wirelessly. The network 670 may alternatively be directly connected to the bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to one or more networks 670. The network 670 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 670 may include wide area networks (WAN), such as the Internet, local area networks (LAN), campus area networks, metropolitan area networks, a direct connection such as through a Universal Serial Bus (USB) port, or any other networks that may allow for data communication. The network 670 may be configured to couple one computing device to another computing device to enable communication of data between the devices. The network 670 may generally be enabled to employ any form of machine-readable media for communicating information from one device to another. The network 670 may include communication methods by which information may travel between computing devices. The network 670 may be divided into sub-networks. The sub-networks may allow access to all of the other components connected thereto or the sub-networks may restrict access between the components. The network 670 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for processing live streaming data, the method comprising:

performing a change point detection on a time series of data using one or more previously collected time series of data;

determining an identification by:

identifying one or more non-anomalous blips in the time series of data based on the change point detection;

identifying one or more anomalous spikes in the time series of data based on the change point detection; and identifying one or more changes in normal in the time series of data based on the change point detection;

displaying the one or more changes in normal from the time series of data based on the identification and one or more user input parameters;

displaying the one or more anomalous spikes from the time series of data based on the identification and the one or more user input parameters, wherein the anomalous spikes indicate an incident in which a computer system does not perform as expected; and automatically implementing a remedy to correct the incident and thereby improve operation of the computer system.

2. The method of claim 1, setting one or more default parameters, wherein one or more default input parameter includes a minimum size parameter, a penalty parameter, a change point detection, parameter; and an anomaly parameter.

3. The method of claim 2, further including:

displaying the one or more changes in normal from the time series of data based on the identification and the one or more default parameters; and displaying the one or more anomalous spikes from the time series of data based on the identification and the one or more default parameters.

4. The method of claim 1, wherein the identifying one or more changes in normal in the time series of data based on the change point detection includes:

comparing one or more previously collected time series of data previous periods with the time series of data, and identifying a significant change in mean or standard deviation from one or more previously collected time series of data, and marking one or more changes in normal based on meeting one or more thresholds and one or more user specified criteria and one or more default criteria.

5. The method of claim 1, wherein the change point detection is performed on the time series of data as it is received, and wherein the time series of data is received and processed in real time, and wherein the time series of data is an incoming time series of data from streaming data.

6. The method of claim 1, including:

performing a change point detection on a time series of data based on one or more user input parameters and one or more default parameters using a previously collected time series of data.

7. The method of claim 1, further including displaying a change in the one or more changes in new normal from the time series of data.

8. The method of claim 7, further comprising marking the new normal as anomalous changes based on a mean, standard deviation, or slope of the data.

9. The method of claim 1, wherein each data stream is configurable to user's specification allowing each source to have dynamic anomaly detection.

10. The method of claim 1, wherein the one or more user input parameters includes a minimum size parameter.

11. The method of claim 1, wherein one or more user input parameters includes a user setting penalty parameter.

12. The method of claim 1, wherein the method is implemented using an application programming interface with a unified stream-processing and batch-processing framework.

13. The method of claim 1, further comprising providing a dynamic output based on user defined anomaly parameters.

14. The method of claim 1, further comprising providing a dynamic output based on user defined change point detection parameters.

15. A system for determining group-level anomalies for information technology events, the system comprising:

a memory having processor-readable instructions stored therein; and at least one processor configured to access the memory and execute the processor-readable instructions to perform operations including:

performing a change point detection on a time series of data using a previously collected time series of data;

determining an identification by:

identifying one or more non-anomalous blips in the time series of data based on the change point detection;

identifying one or more anomalous spikes in the time series of data based on the change point detection; and identifying one or more changes in normal in the time series of data based on the change point detection;

displaying the one or more changes in normal from the time series of data based on the identification and one or more user input parameters;

displaying the one or more anomalous spikes from the time series of data based on the identification and the one or more user input parameters, wherein the anomalous spikes indicate an incident in which the system does not perform as expected; and automatically implementing a remedy to correct the incident and thereby improve operation of the system.

16. The system of claim 15, the operations further including:

setting one or more user input parameters;

wherein one or more user input parameter includes a minimum size parameter;

wherein one or more user input parameter includes a penalty parameter; and wherein one or more user input parameter includes a change point detection parameter;

wherein one or more user input parameter includes an anomaly parameter; and setting one or more default parameters;

wherein one or more default input parameter includes a minimum size parameter;

wherein one or more default input parameter includes a penalty parameter; and wherein one or more default input parameter includes a change point detection parameter;

wherein one or more default input parameter includes an anomaly parameter.

17. A non-transitory computer readable medium storing processor-readable instructions which, when executed by at least one processor, cause the at least one processor to perform operations including:

performing a change point detection on a time series of data using a previously collected time series of data;

performing an identification by:

identifying one or more non-anomalous blips in the time series of data based on the change point detection;

identifying one or more anomalous spikes in the time series of data based on the change point detection; and identifying one or more changes in normal in the time series of data based on the change point detection;

displaying the one or more changes in normal from the time series of data based on the identification and one or more user input parameters;

displaying the one or more anomalous spikes from the time series of data based on the identification and the one or more user input parameters, wherein the anomalous spikes indicate an incident in which a computer system does not perform as expected; and automatically implementing a remedy to correct the incident and thereby improve operation of the computer system.

18. The operations of claim 17, further including:

setting the one or more user input parameters;

wherein one or more user input parameter includes a minimum size parameter;

wherein one or more user input parameter includes a penalty parameter; and wherein one or more user input parameter includes a change point detection parameter;

wherein one or more user input parameter includes an anomaly parameter; and setting one or more default parameters;

wherein one or more default input parameter includes a minimum size parameter;

wherein one or more default input parameter includes a penalty parameter; and wherein one or more default input parameter includes a change point detection parameter;

wherein one or more default input parameter includes an anomaly parameter.

* * * * *